United States Patent
Picaud et al.

(10) Patent No.: US 7,545,149 B2
(45) Date of Patent: Jun. 9, 2009

(54) DRIVER AND RECEIVER CIRCUIT FOR A REMOTELY ARRANGED CIRCUIT AND CORRESPONDING METHOD

(75) Inventors: Benoit Picaud, Villach (AT); Hubert Rothleitner, Villach (AT)

(73) Assignee: Infineon Technologies AG, Munich (DE)

( * ) Notice: Subject to any disclaimer, the term of this patent is extended or adjusted under 35 U.S.C. 154(b) by 160 days.

(21) Appl. No.: 11/453,277

(22) Filed: Jun. 14, 2006

(65) Prior Publication Data
US 2007/0008671 A1    Jan. 11, 2007

(30) Foreign Application Priority Data
Jun. 14, 2005    (DE) .................. 10 2005 027 446

(51) Int. Cl.
    *G01R 31/08* (2006.01)
(52) U.S. Cl. .................. 324/522; 324/73.1; 361/93.1
(58) Field of Classification Search .................. 324/522, 324/73.1; 361/93.1
    See application file for complete search history.

(56) References Cited

U.S. PATENT DOCUMENTS
4,736,267 A    4/1988   Karlmann et al.
5,687,330 A *  11/1997  Gist et al. .................. 710/305
5,943,205 A    8/1999   Erckert et al.

FOREIGN PATENT DOCUMENTS
DE    102 56 057 B3    5/2004
DE    103 35 904 A1    2/2005

OTHER PUBLICATIONS
"Airbag Satellite Receive IC." TLE7719-T, V1.1 Infineon Technologies AG, Munich: Sep. 2004 (75 Pages).

* cited by examiner

*Primary Examiner*—Vincent Q Nguyen
(74) *Attorney, Agent, or Firm*—Maginot, Moore & Beck (57) ABSTRACT

A driver and receiver circuit includes at least one output terminal for connecting a line connection. The circuit further includes a voltage supply arrangement connected to the at least one output terminal and a current measuring arrangement connected to the at least one output terminal. The current measuring arrangement is designed to detect a current at the at least one connecting terminal and to generate a current measurement signal dependent on said current. The driver and receiver circuit further includes a control circuit, to which the current measurement signal is fed, and at least one monitoring circuit. The monitoring circuit is designed to detect the current at the at least one connecting terminal and to output an error signal if the current lies above a predetermined threshold value for a time duration which is longer than a predetermined first time duration.

10 Claims, 10 Drawing Sheets

DRIVER AND RECEIVER CIRCUIT FOR A REMOTELY ARRANGED CIRCUIT AND CORRESPONDING METHOD

FIELD OF THE INVENTION

The invention relates to a driver and receiver circuit for a remotely arranged circuit and a method for monitoring a line connection between a driver and receiver circuit and a remotely arranged circuit.

BACKGROUND

Driver and receiver circuits for a remotely arranged circuit are sufficiently known and serve for example for supplying voltage to remotely arranged sensors and for receiving sensor signals from such sensors. One example of such a driver and receiver circuit is the integrated component TLE7719-T from Infineon Technologies AG, Munich, which serves for supplying voltage to airbag sensors and for communication with airbag sensors. This component is described in the data sheet "SatRIC™ Airbag Satellite Receive IC, TLE7719-T", Version 1.1, 2004 Sep. 13, Infineon Technologies AG, Munich.

In order to afford a better understanding, the basic construction of such a driver and receiver circuit and its interconnection with a remotely arranged circuit, which is referred to hereinafter as "satellite circuit", are explained with reference to FIG. 1.

Figure 1:
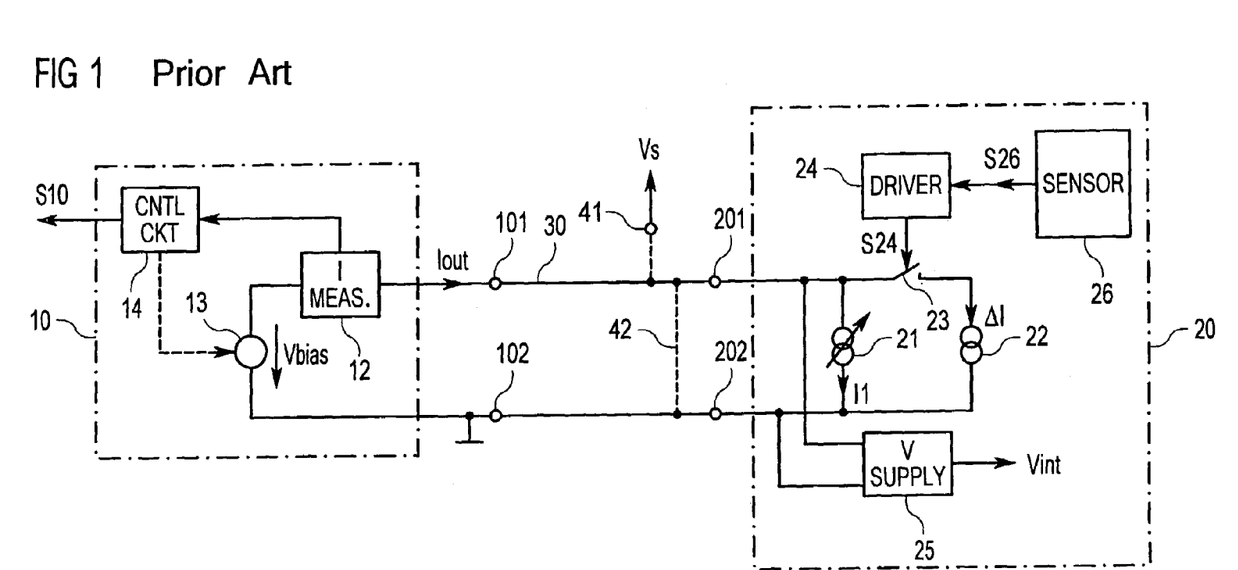
FIG. 1 shows a driver and receiver circuit with a satellite circuit connected thereto according to the prior art.

In FIG. 1, the driver and receiver circuit is designated by the reference symbol 10 and the satellite circuit is designated by the reference symbol 20. The driver and receiver circuit 10 has output terminals 101, 102 for connecting a line connection 30. Via said line connection 30, during operation, voltage is supplied to the satellite circuit 20 and information is transmitted from the satellite circuit 20 to the driver and receiver circuit 10.

The driver and receiver circuit 10 makes a supply voltage Vbias available via the connecting terminals 101, 102 at the line connection 30 by means of a voltage source 13. By means of a current measuring arrangement 12, the driver and receiver circuit 10 additionally determines a current Iout flowing via the terminals 101, 102 and supplies an item of current information to a central control circuit 14.

The satellite circuit 20 is connected to the line connection 30 via terminals 201, 202 and is designed to modulate the current flowing via the line connection 30 such that it assumes a first or a second current value. For this purpose, the satellite circuit 20 has two current sources 21, 22, for example, a first 21 of which is always connected to the line connection 30 and a second of which can be connected in parallel with the first current source 21 via a switch 23 according to a control signal 24. The satellite circuit 20 comprises a sensor 26, for example, such as an airbag sensor, for example, which provides a sensor signal S26, according to which a driver circuit 24 generates the control signal S24 for the modulation of the current Iout.

An internal supply voltage Vint of the satellite circuit 20 is generated from the voltage Vbias present at the line connection 30 by a voltage supply circuit 25.

Figure 2:
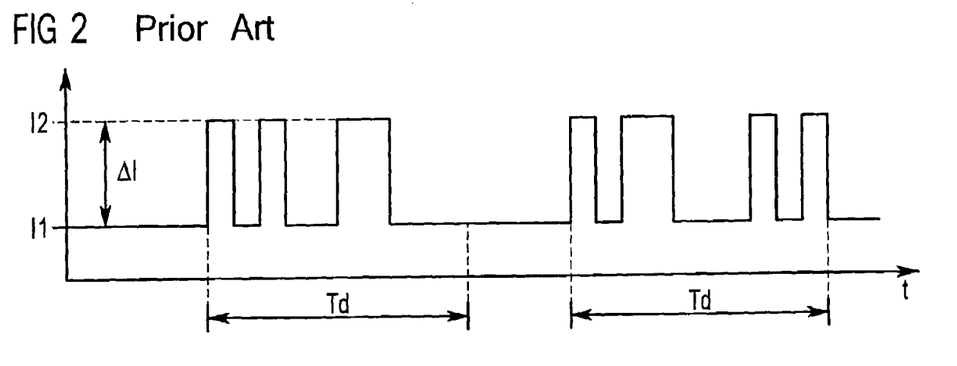
FIG. 2 shows the temporal profile of the output current of the driver and receiver circuit according to FIG. 1, the output current being modulated by the satellite circuit.

FIG. 2 shows by way of example the temporal profile of the current Iout flowing via the line connection 30. During disturbance-free operation, said current assumes two current values, a first current value I1 corresponding to the current supplied by the first current source 21, and a second current value I2 corresponding to the sum of the currents supplied by the two current sources 21, 22 of the satellite circuit 20. The current Iout flowing via the line connection 30 represents a coded or modulated signal. In this case, the information to be transmitted from the satellite circuit 20 to the receiver circuit 10 may be contained in the two different levels of the current signal Iout or in the level changes of said current signal Iout. The information from the satellite circuit 20 to the receiver circuit 10 is transmitted in the form of "data packets", for example, the individual information symbols of which are transmitted successively within a time duration Td.

The receiver circuit 10 is designed to demodulate and, if appropriate, decode the information contained in the current signal Iout and to generate a control signal S10, which may be for example a firing signal for an occupant protection system of a motor vehicle.

An erroneous operating state can occur in the case of such a receiver circuit when a short circuit occurs between the connecting terminals 101, 102, as is illustrated by the reference symbol 42 in FIG. 1. A further erroneous operating state is present when there is a short circuit between the line connection 30 and a terminal for a supply potential Vs. The effects of such an error are that the communication link to the satellite circuit 20 is interrupted. Furthermore, the driver and receiver circuit 10 may be damaged on account of such an error because the currents flowing during such an error state may be considerably greater than the currents flowing during normal operation. Moreover, a permanent overcurrent may lead to a dip in the voltage supply and thus also to a disturbance of adjacent channels (not illustrated).

In order to protect the driver and receiver circuit 10 against such high currents, it is known, in principle, to provide a current limiting arrangement that limits the output currents of the circuit 10. However, since the receiver circuit 10 must be able to generate comparatively high currents for short time durations, the current limit value has to be set comparatively high, so that in the event of permanently flowing currents corresponding to the current limit value, the circuit 10 may be overheated and possibly damaged.

An over-temperature shutdown may protect against such overheating, although devices that provide such shutdown generally respond only in a time-delayed manner depending on the ambient temperature.

There is a need, therefore, for a driver and receiver circuit which is better protected against error states.

SUMMARY

At least some embodiments of the invention address the above-stated need, as well as other by providing a driver and receiver circuit, and/or a method, that monitors a line connection connected to a driver and receiver circuit.

A first embodiment of a driver and receiver circuit according to the invention has at least one output terminal for connecting a line connection, a voltage supply arrangement connected to the at least one output terminal, and a current measuring arrangement connected to the at least one output terminal. The current measuring arrangement is designed to detect a current at the at least one connecting terminal and to generate a current measurement signal dependent on the current, which current measurement signal is fed to a control circuit. The driver and receiver circuit additionally has at least one monitoring circuit, which is designed to detect the current at the at least one connecting terminal and to output an error signal if the current lies above a predetermined threshold value for a time duration which is longer than a predetermined time duration.

The voltage supply arrangement can advantageously be deactivated by means of the error signal generated by the monitoring circuit. The deactivation of the voltage supply arrangement is effected directly by means of the error signal in one embodiment of the invention and indirectly by means of the control circuit in another embodiment of the invention. In this case, the error signal is fed to the control circuit, and the control circuit is designed to deactivate the voltage supply arrangement depending on the error signal.

The voltage supply arrangement can be activated and deactivated by a control signal generated for example by the control circuit. In this case, the monitoring circuit is designed to generate, after a level change of the control signal to a level that activates the voltage supply arrangement, the error signal at the earliest after a second time duration has elapsed after the level change. This takes account of the fact that after activation of the voltage supply arrangement, even in the case of an error-free operating state, an increased current may flow via the output terminals for a predetermined time duration until an inevitably present parasitic capacitance of the line connection has been charged.

Another embodiment of the invention is a method for monitoring a line connection connected to a driver and receiver circuit that provides for determining a current flowing into the line connection or from the line connection. The method further includes generating a current measurement value dependent on the current, comparing the current measurement value with a reference value, and generating an error signal if the current measurement value exceeds the reference value for a time duration which is longer than a predetermined first time duration.

In this case, the error signal will advantageously be generated after a level change of a voltage present at the line connection at the earliest after a second time duration has elapsed.

The above described features and advantages, as well as others, will become more readily apparent to those of ordinary skill in the art by reference to the following detailed description and accompanying drawings.

DETAILED DESCRIPTION

In the figures, unless specified otherwise, identical reference symbols designate identical circuit components and signals with the same meaning.

Figure 3:
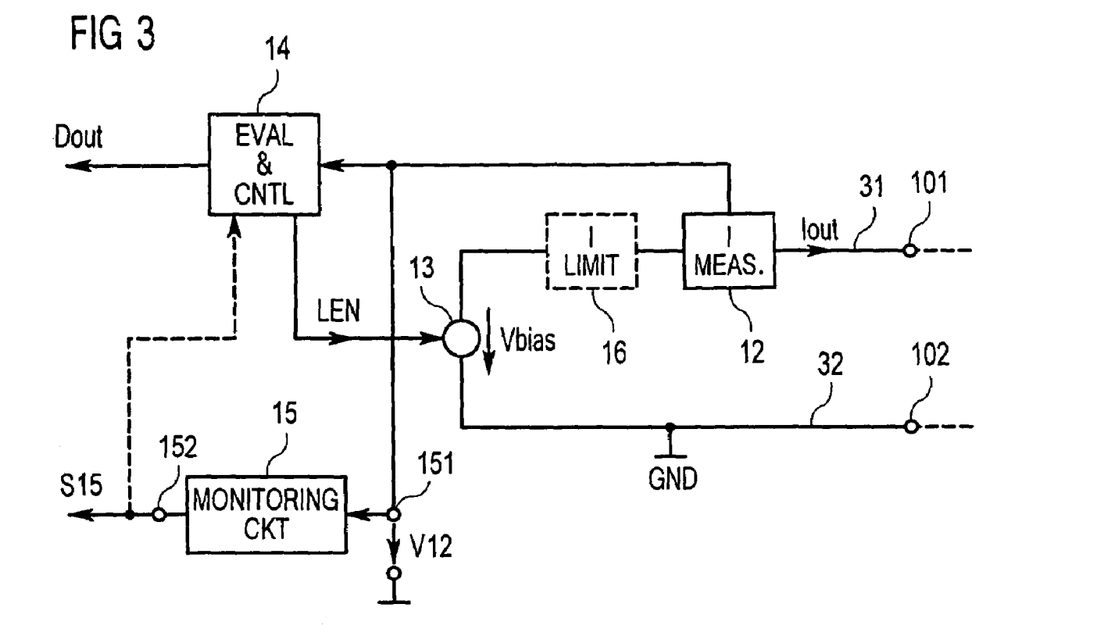
FIG. 3 shows a first exemplary embodiment of a driver and receiver circuit according to the invention.

FIG. 3 shows a first exemplary embodiment of a driver and receiver circuit according to the invention. This driver and receiver circuit has output terminals 101, 102 for connecting a line connection (not illustrated in FIG. 3). A bias voltage source 13 is coupled to said output terminals 101, 102 and makes a bias voltage or supply voltage Vbias available at the connecting terminals 101, 102 according to a control signal LEN.

A current measuring arrangement 12 is connected between the voltage source 13 serving as voltage supply arrangement and one of the connecting terminals 101. This current measuring arrangement 12 has the task of detecting an output current Iout flowing via the connecting terminals 101, 102 and making available a current measurement signal V12 dependent on said output current Iout. The current measurement signal V12 is fed to an evaluation and control circuit 14, which generates an output signal DOUT from the voltage measurement signal V12.

The evaluation and control circuit 14 may be a conventional evaluation and control circuit which, for example, is designed to demodulate data information modulated on the output current Iout or the current measurement signal V12 and to convert it into the output signal DOUT. The evaluation and control circuit 14 additionally makes the control signal LEN available, according to which the voltage source 13 is activated and deactivated.

The driver and receiver circuit has a monitoring circuit 15 having an input 151 operably connected to receive the current measurement signal V12. The monitoring circuit 15 is designed to generate an error signal S15 depending on the current measurement signal V12 at an output 152. The monitoring circuit 15 is designed to generate a level of the error signal S15 indicating an error when the current measurement signal V12 has a value indicating that the output current Iout lies above a predetermined threshold value for longer than a predetermined first time duration. The current measurement signal V12 is advantageously proportional to the output current Iout, so that the monitoring circuit 15 generates a level of the error signal S15 indicating an error when the current measurement signal V12 lies above a measurement signal limit value for a period of time that is longer than the predetermined first time duration.

In order to be able to identify an erroneous operating state as rapidly as possible, the first time duration is as short as possible. In this embodiment, the first time duration is also longer than a data block period (Td in FIG. 2) during which the output current Iout is modulated by a satellite circuit (not illustrated in FIG. 3). Such data blocks are separated by time segments during which the output current Iout assumes a low current level in the error-free operating state. If the output current Iout remains above the lower current level I1 during a time duration that is longer than said data block period Td, then this already indicates an erroneous operating state. The current level with which the output current Iout is compared by the monitoring circuit must lie above the lower current level I1 but may be less than the upper current level I2 since, in error-free operation, the output current Iout falls at the latest after the data block period Td has elapsed.

Figure 4:
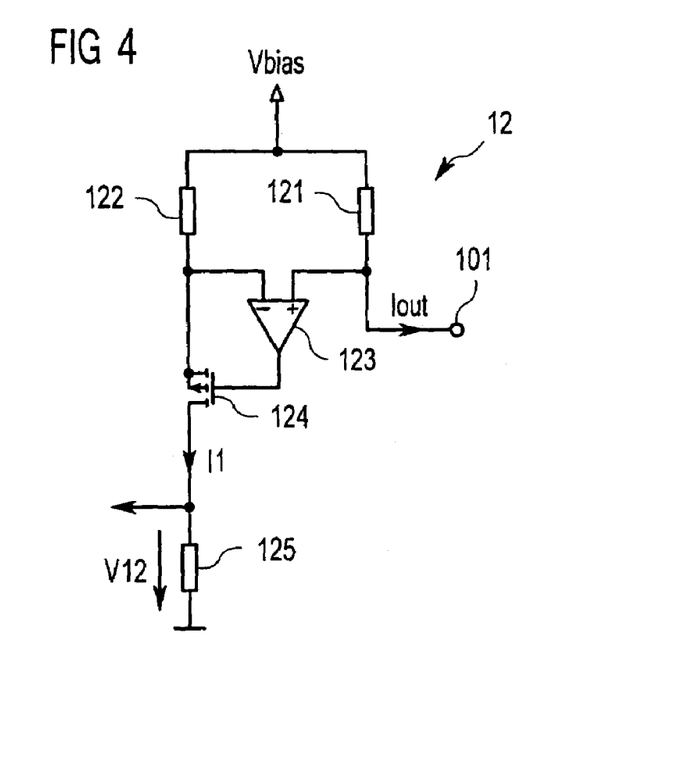
FIG. 4 shows an exemplary circuitry realization of a current measuring arrangement present in the driver and receiver circuit.

FIG. 4 shows an exemplary circuitry realization of the current measuring arrangement 12 illustrated in FIG. 3, which is connected between the supply voltage source 13 and the first output 101 and generates the current measurement signal V12. This current measuring arrangement 12 has a measuring resistor 121 connected between the terminal for the supply potential Vbias and the output 101, the output current flowing through said measuring resistor. Connected to said current measuring resistor 121 is a current mirror arrangement having a further resistor 122, an operational amplifier 123 and a transistor 124, which current mirror arrangement is designed to generate a measurement current I1 proportional to the output current Iout. The resistor 122 of the current mirror arrangement is connected in series with the transistor 124, which serves as a regulating element. The operational amplifier 123 is connected to the terminals of the two resistors 121, 122 that are remote from the supply potential Vbias, and drives the regulating transistor 124 in such a way that the voltage drop across the further resistor 122 corresponds to the voltage drop across the measuring resistor 121. The current I1 flowing through the further resistor 122 is then proportional to the output current Iout. In this case, the proportionality factor results from the ratio of the resistances of the two resistors, where the following holds true:

$$I1 = R121/R122 \cdot Iout \qquad (1).$$

In this case, R121, R122 denote the resistances of the two resistors 122, 121.

A current detecting resistor 125 is connected in series with the transistor 124, the measurement current I1 flowing through said current detecting resistor. The current measurement signal V12 proportional to the output current Iout is present across said detecting resistor 125. In this example, the current measurement signal V12 is a voltage signal which is fed to the control circuit 14. The following holds true in the example for the ratio between output current Iout and current measurement signal V12:

$$V12 = R125 \cdot R121/R122 \cdot Iout \qquad (2).$$

In this case, R125 denotes the resistance of the current detecting resistor 125.

Figure 5:
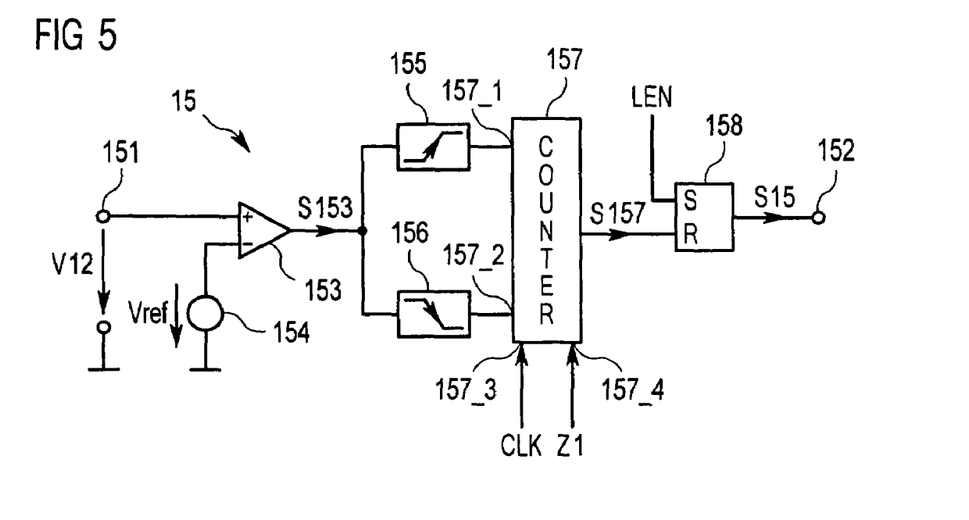
FIG. 5 shows a first exemplary embodiment of a monitoring circuit present in the driver and receiver circuit.

FIG. 5 shows an exemplary circuitry realization of the monitoring circuit 15, to which the current measurement signal V12 is fed and which generates the error signal S15 depending on said current measurement signal V12.

The monitoring circuit 15 has a comparator 153, one input of which, the noninverting input in the example, is fed the current measurement signal V12 and the other input of which, the inverting input in the example, is fed a reference signal Vref generated by a reference voltage source 154. The comparator 153 generates a comparison signal S153 dependent on the comparison of the reference signal Vref with the current measurement signal V12. In the example, said comparison signal S153 has a high level if the current measurement signal V12 is greater than the reference signal Vref, and has a low level if the measurement signal V12 is less than the reference signal Vref.

First and second edge detectors 155, 156 are connected downstream of the comparator 153. The first edge detector 155 detects rising edges of the comparison signal S153, and the second edge detector 156 detects falling edges of the comparison signal S153. Said edge detectors 155, 156 are designed for example to make available a signal pulse at their outputs after a rising and falling edge, respectively, of the comparison signal S153. An output signal S155 of the first edge detector 155 is fed to a start input 157_1 of a counter 157 connected downstream. An output signal S156 is fed to a reset input 157_2 of said counter 157. Said counter 157 is designed to be incremented proceeding from an initial value after receiving a start pulse at the start input 157_1 in time with a clock signal CLK fed to a clock input 157_3. This counting operation is interrupted and the counter is reset if a reset pulse is present at the reset input 157_2. The counter 157 provides a two-value counter signal S157. This counter signal S157 assumes a high level if an internal counter reading of the counter 157 attains a first counter reading Z1. Said counter reading can be set via a further input 157_4 of the counter 157.

The counter signal S157 is fed to a reset input R of a flip-flop 158 connected downstream. In the example, the activation signal LEN of the voltage source (13 in FIG. 3) is fed to the set input 158 of said flip-flop. The error signal S15 is available at the output of the flip-flop 158. In the example, said error signal S15 assumes a high level if the activation signal LEN assumes a high level in order to activate the voltage source 13. In this connection, a high level of the error signal S15 indicates an error-free operating state.

The flip-flop 158 is reset by means of a high level of the counter signal S157, as a result of which the error signal S15 assumes a low level, which in this case indicates an erroneous operating state. The operations which lead to a resetting of the flip-flop 158 and thus to the generation of a level of the error signal S15 indicating an error are explained below with reference to FIG. 6.

Figure 6:
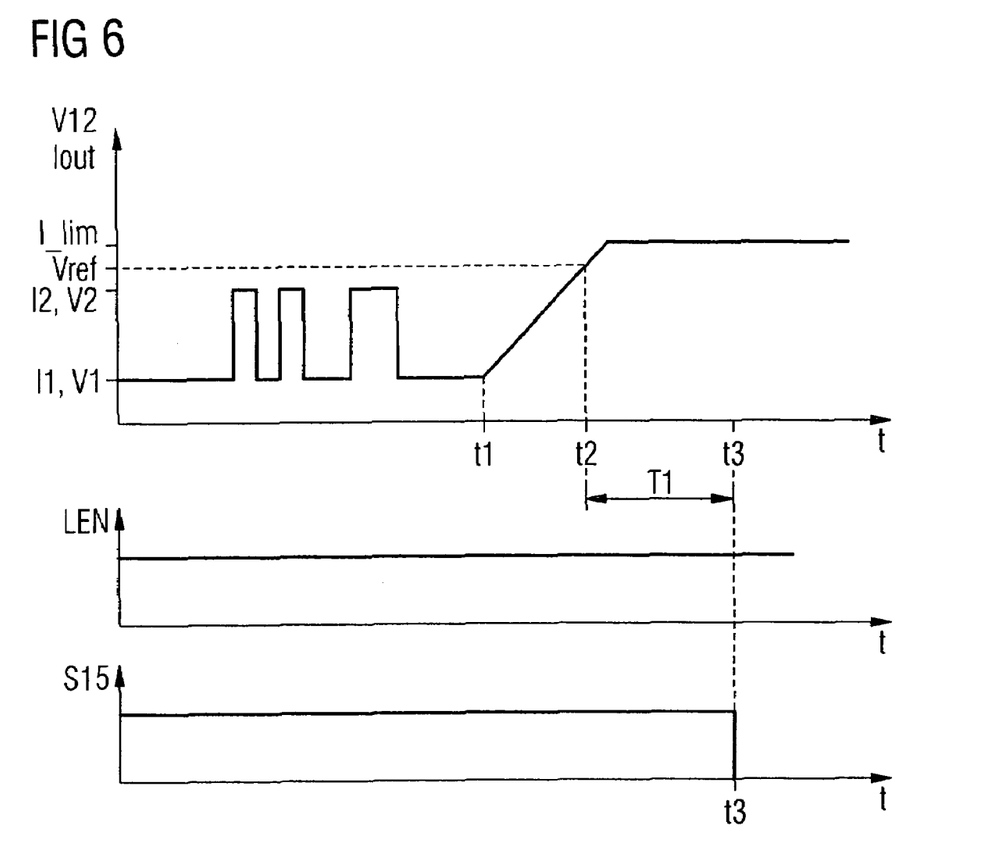
FIG. 6 shows by way of example temporal profiles of the output current of the driver and receiver circuit and of an output signal of the monitoring circuit.

The temporal profile of the output current Iout and the temporal profile of the current measurement signal V12 proportional to said output current Iout are plotted by way of example in FIG. 6. It is assumed in the example illustrated that an error-free state is present up to an instant T1, so that, up to said instant t1, the output current Iout is switched back and forth between a lower current level I1 and an upper current level I2 in a manner modulated by a satellite circuit. A first current measurement signal level V1 of the current measurement signal V12 corresponds to the lower current level I1, and an upper current measurement signal level V2 corresponds to the upper current level I2. At the instant t1 an error occurs, as a result of which the output current Iout rises permanently to a value lying above the upper current level I2. Referring to FIG. 1, such an error may occur for example by virtue of the connecting terminals 101, 102 of the driver and receiver circuit 10 being short-circuited. The output current Iout is limited to an upper limit value I_lim in such a case by means of a current limiting circuit, the current limiting circuit being designated by the reference symbol 16 in FIG. 3.

In the example, the reference value Vref with which the voltage measurement signal is compared is greater than the second current measurement signal level V2. The current measurement signal V12 reaches said reference level Vref at an instant t2. At said instant t2 the first edge signal detector 155 detects a rising edge of the comparator signal S153 and thus starts the counter 157. The counter 157 is incremented starting from said instant t2 in time with the clock signal CLK until its counter reading reaches the comparison value Z1. The counter output signal S157 then assumes a high level in order to reset the output flip-flop 158 and thus to set the error signal S15 to a low level.

In this example, the first time duration T1 is the time duration between the instant t2, at which the current measurement signal V12 exceeds the reference value Vref, and an instant t3, at which the error signal is set to a low level. In the example, this first time duration is dependent on the clock frequency f_CLK of the clock signal CLK and the comparison counter reading Z1. The following holds true in the example for said first time duration T1:

$$T1 = 1/f\_CLK \cdot Z1 \quad (3).$$

In the example, the setting of the output flip-flop 158 is effected by the activation signal LEN provided by the control circuit (14 in FIG. 3), which activation signal activates the voltage source 13 in such a way that the latter provides a supply voltage Vbias at the output terminals 101, 102.

A line connection (30 in FIG. 1) connected to the output terminals 101, 102 of the driver and receiver circuit 10 during operation unavoidably has a parasitic capacitance. This capacitance is all the greater, the longer the line connection between the driver and receiver circuit 10 and a satellite circuit. On account of said parasitic capacitance, a large output current Iout may arise directly after activation of the voltage source 13 until said parasitic capacitance has been charged to the value of the supply voltage Vbias.

In this case, the time duration for which such a high output current flows may be in particular greater than the first time duration T1, which is coordinated for example with a data block duration Td of the transmission protocol between the satellite circuit and the driver and receiver circuit 10. In order to prevent a high output current Iout after activation of the voltage source 13 from being identified as an error, the monitoring circuit 15 is preferably designed to generate a level of the error signal S15 indicating an error at the earliest after a second time duration T2 after activation of the voltage source 13 or after the control signal LEN has assumed an activation level.

Figure 7:
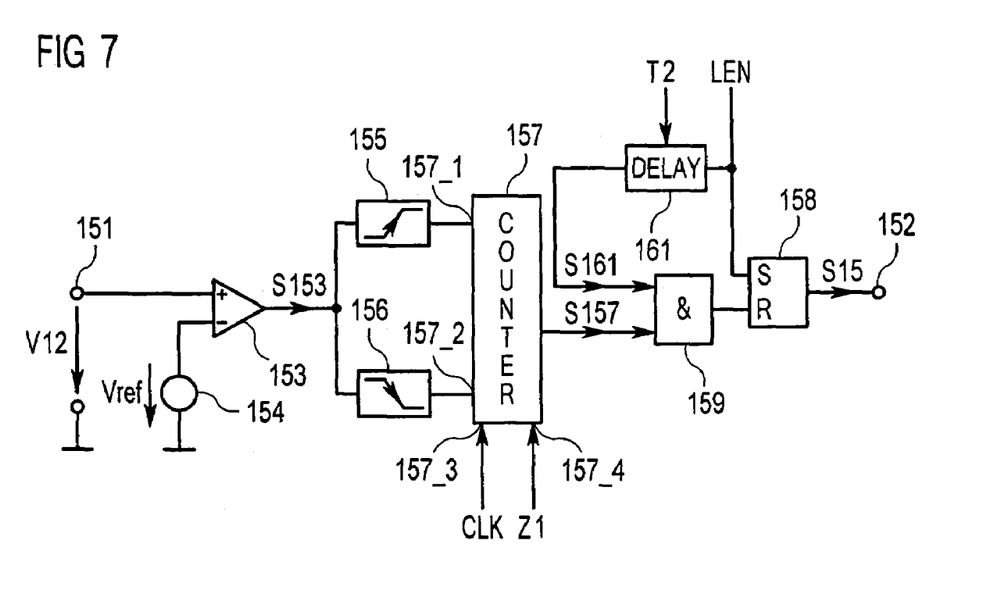
FIG. 7 shows a second exemplary embodiment of a monitoring circuit.
Figure 8:
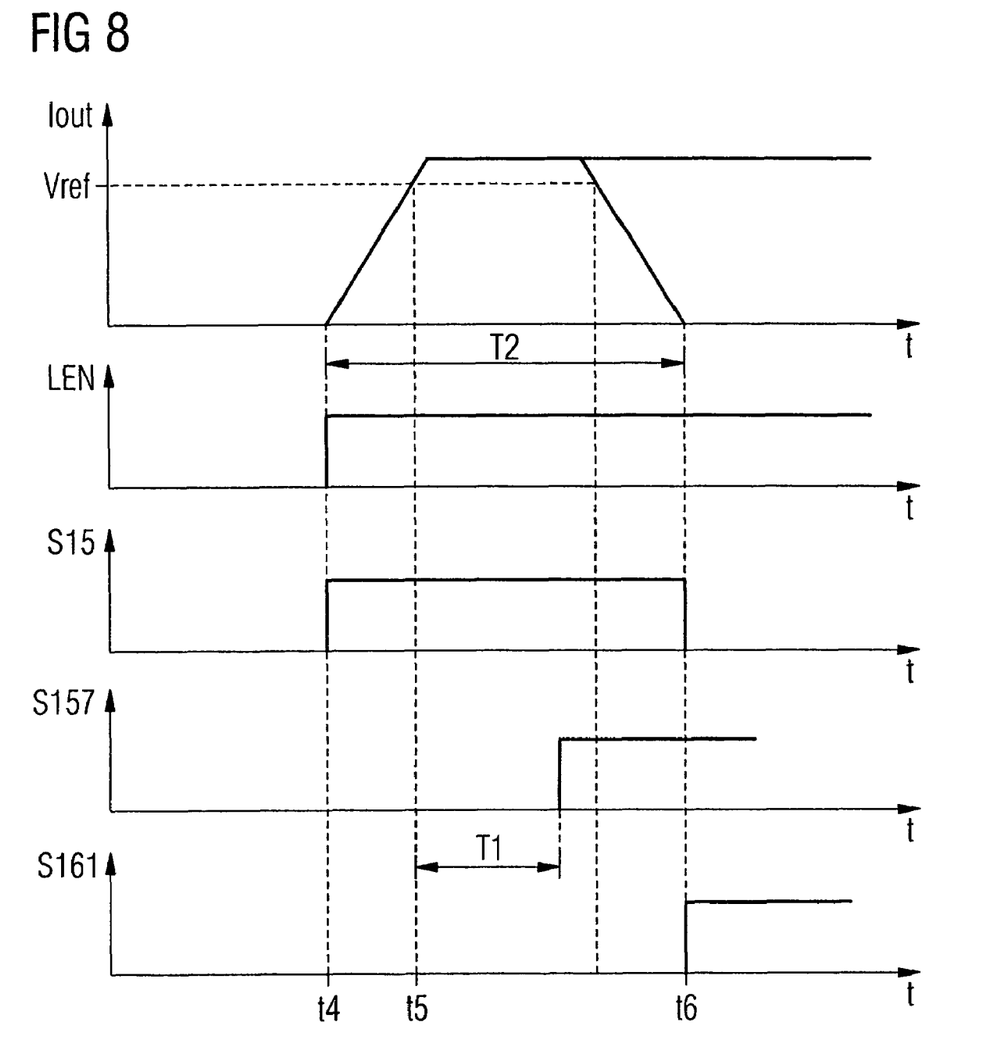
FIG. 8 shows temporal profiles of an output current of the driver and receiver circuit and of an output signal of the monitoring circuit.

FIG. 7 shows a monitoring circuit 15 which ensures such a function. In addition to the monitoring circuit illustrated in FIG. 5, this monitoring circuit 15 has a delay element 161, to which the activation signal LEN is fed and which is designed to generate a rising edge of the activation signal LEN in a manner time-delayed by the second time duration T2. A delay signal S161 is available at the output of said delay element 161. The temporal profile of said delay signal S161 in dependence on the activation signal LEN is illustrated in FIG. 8. In the example, the activation signal LEN assumes a high level at an instant t4. The delay signal S161 follows the activation signal LEN in a manner time-delayed by the second time duration T2.

The current measurement signal V12 exceeds the reference value Vref at an instant t5 in the example. The counter output signal S157 assumes a high level after the first time duration T1 after said instant t5. Referring to FIG. 7, said counter signal S157 is fed together with the comparison signal S161 to an AND gate 159, the output signal of which is fed to the reset input of the output flip-flop 158. This ANDing of the comparison signal S161 and of the counter output signal S157 ensures that the flip-flop 158 is reset at the earliest after the second time duration T2 has elapsed after a rising edge of the activation signal LEN, in order to generate a low level of the error signal S15 indicating an error.

FIG. 8 illustrates in dash-dotted fashion the case where the current measurement signal V12 falls to a value below the reference voltage Vref whilst still within the time duration T2 after the rising edge of the activation signal LEN. The counter 157 is thereby reset again before the second time duration T2 has actually elapsed, so that a low level of the error signal S15 is not generated. A low level of the error signal is generated in this case, referring to FIG. 6, only when, at a later point in time, the current measurement signal V12 remains above the reference value Vref for a time duration longer than the first time duration T1.

In the exemplary embodiment in accordance with FIG. 7, the second time duration T2, after the elapsing of which the error signal can at the earliest be set to a low level, begins with a rising edge of the activation signal LEN. There is also the possibility of not starting this second time period or waiting duration T2 until the instant at which the current measurement signal V12 exceeds the reference value Vref.

Figure 9:
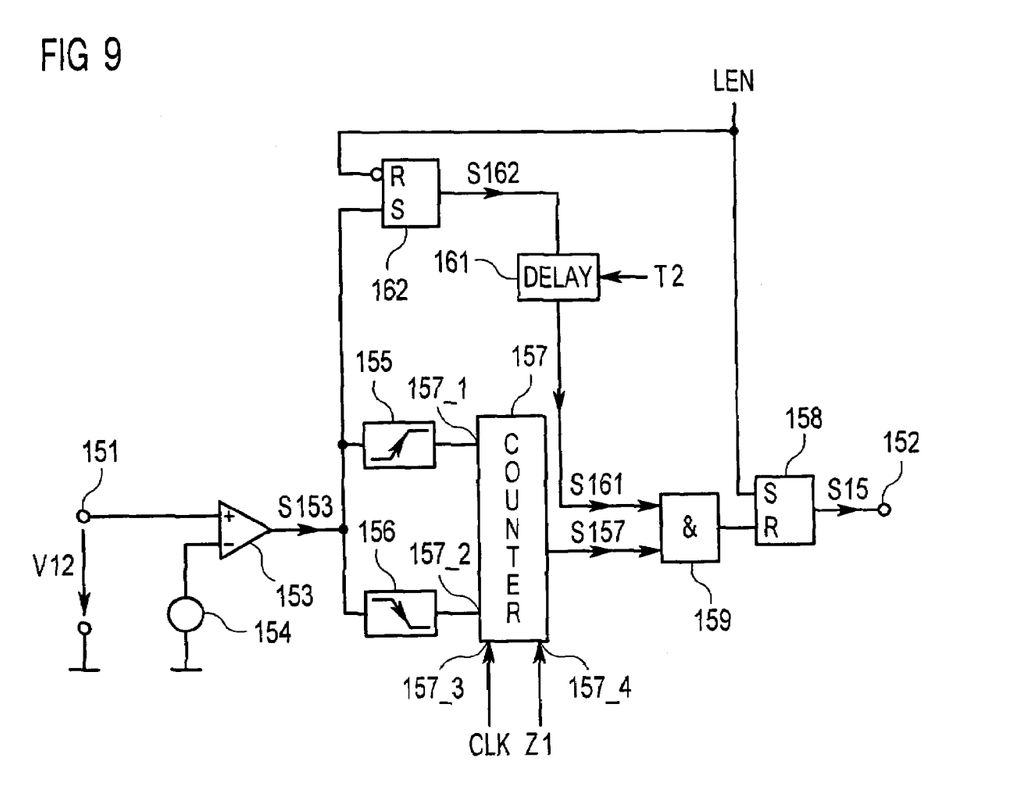
FIG. 9 shows a further exemplary embodiment of a monitoring circuit.

An exemplary circuitry realization of a monitoring circuit which ensures such a function is illustrated in FIG. 9. This monitoring circuit 15 contains a further flip-flop 162, the set input of which is fed the comparator signal S153. This flip-flop has an inverting reset input, to which the activation signal LEN is fed. Said further flip-flop 162 is reset with a falling edge of the activation signal LEN, that is to say when the voltage source 13 is deactivated, and is set with a rising edge of the comparator signal S153. Said further flip-flop 162 is thus set when the voltage measurement signal V12 exceeds the reference value Vref for the first time after an activation of the voltage source. An output signal S162 of said flip-flop 162 is fed to the delay element 161, which delays said output signal by the time duration T2.

Figure 10:
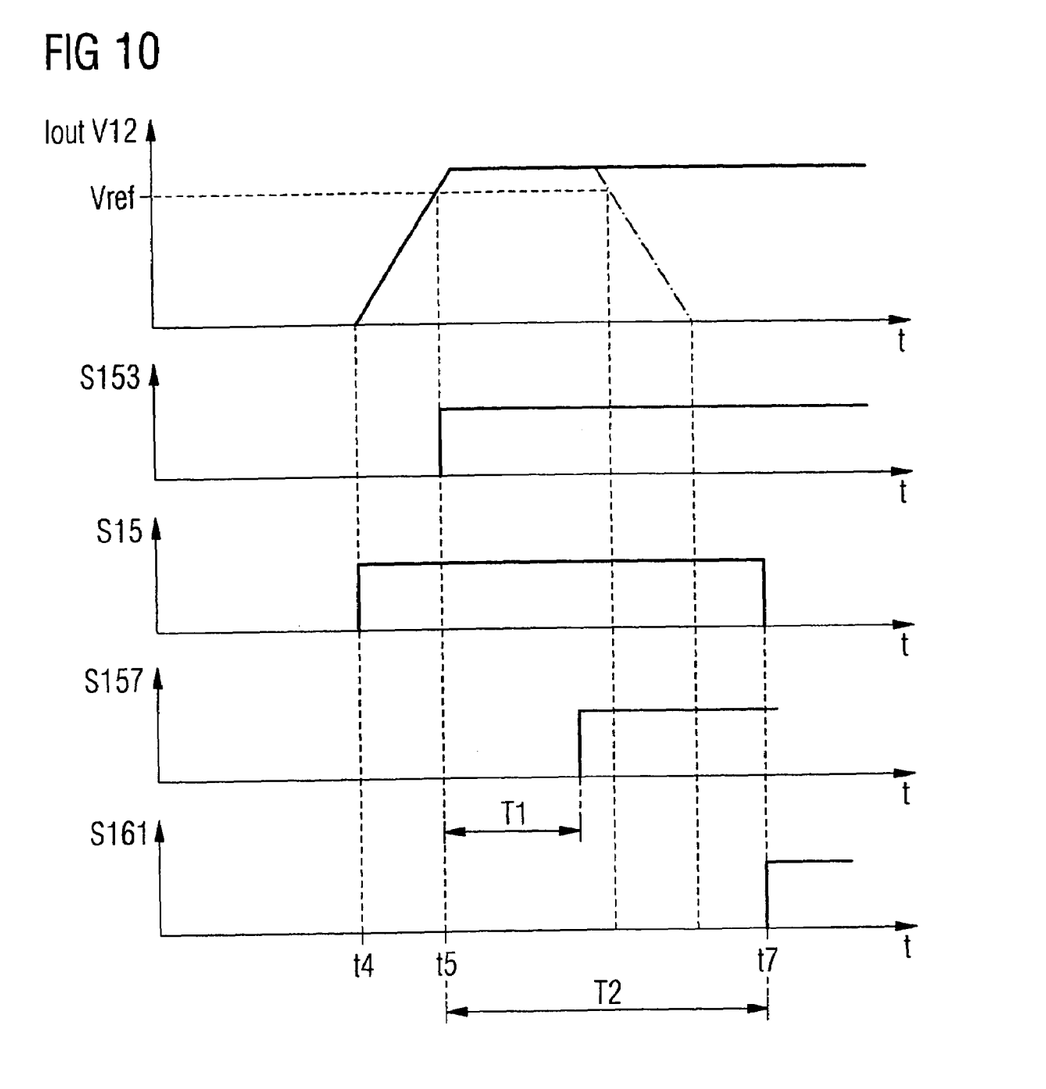
FIG. 10 shows by way of example temporal profiles of selected signals occurring in the monitoring circuit according to FIG. 9.

FIG. 10 shows the temporal profile of the output signal S162 of the further flip-flop and of the time-delayed signal S161 resulting therefrom. In the example, the voltage measurement signal V12 exceeds the reference value Vref at the instant T5, as a result of which the comparator signal S153 and the output signal S162 of the further flip-flop 162 assume a high level. The comparison signal S161 follows this high level in a manner time-delayed by the second time duration T2 at the instant t7. Assuming that the counter signal S157 has a high level at this instant, the error signal S15 is set to a low level at this instant.

It is assumed in the case of the circuit illustrated in FIG. 9 that the voltage measurement signal V12 exceeds the reference value Vref for a short time after activation of the voltage source 13 even in the error-free state. As a result, the further flip-flop 162 is set shortly after activation of the voltage source 13. This ensures that a wait is effected comprising the longer second time duration T2 in the case of an error state only during the time duration directly after activation of the voltage source, while at later points in time a wait is effected only comprising the shorter first time duration T1 until an error level of the error signal S15 is generated upon the occurrence of an error state.

Figure 11:
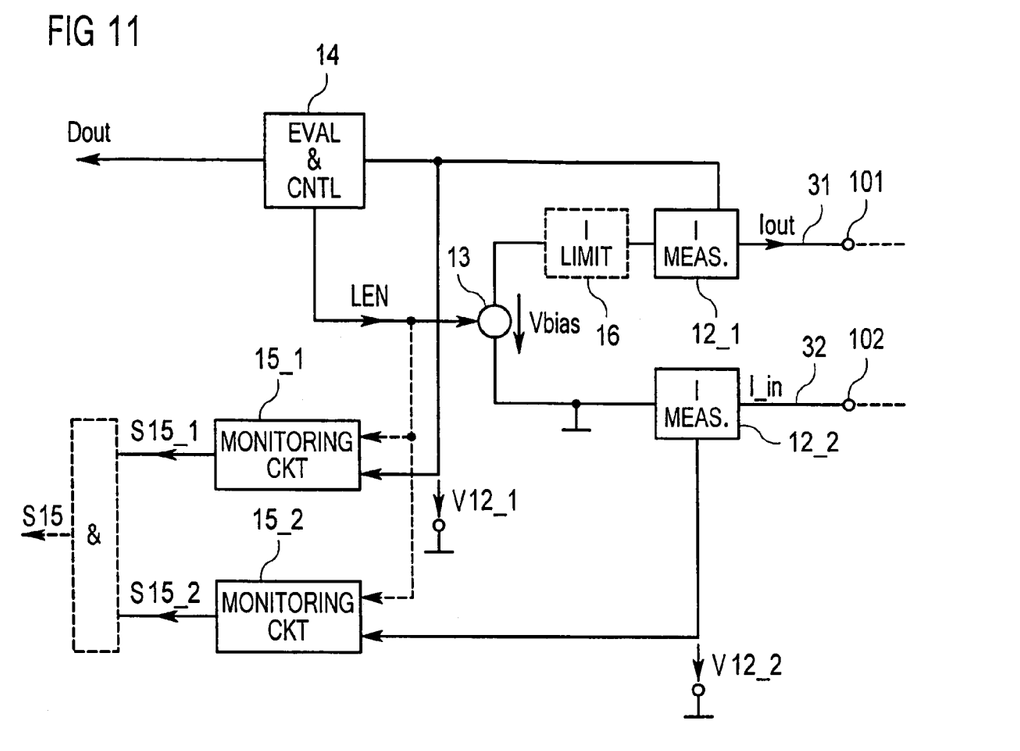
FIG. 11 shows an exemplary embodiment of a driver and receiver circuit according to the invention which has two monitoring circuits.

FIG. 11 shows a further exemplary embodiment of a driver and receiver circuit. This driver and receiver circuit has two current measuring arrangements 12_1, 12_2, one of which is connected between the voltage source 13 and the first output 101 and the other of which is connected between the voltage source 13 and the second output 102. These two current measuring arrangements 12_1, 12_2 respectively generate a current measurement signal V12_1, V12_2. The current measurement signal V12_1 of the first current measuring arrangement 12_1 is in this case fed to a first monitoring circuit 15_1, while the current measurement signal V12_2 of the second current measuring arrangement 12_2 is fed to a second monitoring circuit 15_2. The two monitoring circuits respectively generate an error signal S15_1, S15_2. The construction and functioning of these two monitoring circuits 15_1, 15_2 correspond to the construction and the functioning of one of the monitoring circuits explained above.

The error signals S15_1, S15_2 are preferably fed to an AND gate 19, at the output of which an error signal S15 is available which assumes a low level indicating an error in each case when one of the two error signals S15_1, S15_2 assumes a low level.

The provision of two current measuring arrangements 12_1, 12_2 and the corresponding provision of two monitoring circuits 15_1, 15_2 afford the advantage that additional errors can be identified in comparison with the monitoring circuits explained above. The following errors are detected by the driver and receiver circuit in accordance with FIG. 11:

a short circuit between the output terminals 101, 102. In this case, an increased current flow is detected by both evaluation circuits 15_1, 15_2 by means of the current measurement signals V12_1, V12_2, as a result of which both error signals S15_1, S15_2 assume a low level, a short circuit of the supply line 31 connected to the first terminal 101 with respect to a reference-ground potential GND. In this case, an increased current from the driver and receiver circuit flows via the first output terminal 101, but no current flows back via the second terminal 102. This error is detected by the first evaluation circuit 15_1 by means of the first current measurement signal V12_1, a short circuit of the line connection 32 connected to the second terminal 102 with respect to a positive supply potential. In this case, an increased current I_in flows into the driver and receiver circuit via the second connecting terminal 102. This error is detected by the second evaluation circuit 15_2 by means of the second current measurement signal V12_2.

The current measuring arrangements 12_1 may be realized according to the current measuring arrangement 12 illustrated in FIG. 4.

Figure 12:
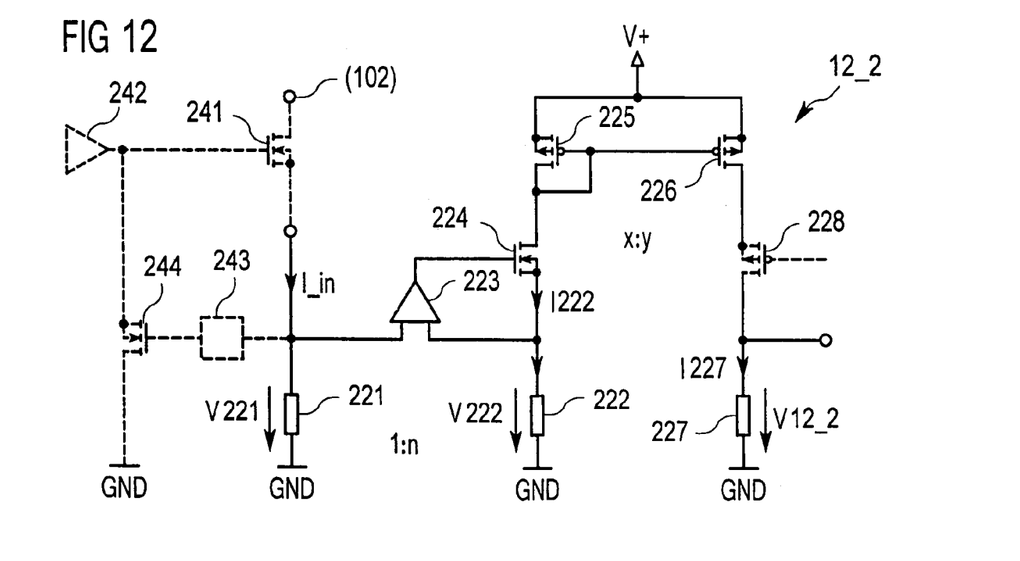
FIG. 12 shows a further exemplary embodiment of a current measuring arrangement.

One possible circuit for realizing the current measuring arrangement 12_2 is illustrated in FIG. 12. In the case of this circuit, a current detecting resistor 221 is connected between the second terminal 102 and reference-ground potential GND. The input current I_in flowing through said current detecting resistor 221 is mapped by a regulating and current mirror arrangement onto an output resistor 227 of the current measuring arrangement 12_2, across which the current measurement signal V12_2 is available. The regulating and current mirror arrangement has a further resistor 222 connected in series with a regulating transistor 224 between a supply potential V+, for example a logic supply potential, and reference-ground potential GND. The regulating transistor 224 is driven by an operational amplifier 223, which compares voltages V221, V222 across the current detecting resistor 221 and across the further resistor 222 and which drives the regulating transistor 224 in such a way that the voltage drops V221, V222 across these two resistors are identical. A current I222 flowing through the further resistor is then proportional to the input current I_in by way of the ratio of these two resistors 221, 222. The following holds true in this case:

$$I222 = 1/n \cdot I\_in \quad (4).$$

The current I222 flowing through the further resistor 222 is mapped onto the output resistor 227 by means of a current mirror. The current mirror has an input transistor 225 that is connected up as a diode and is connected in series with the further resistor 222 and the regulating transistor 224. An output transistor 226 of this current mirror is connected in series with the output resistor 227 between the supply potential V+ and reference-ground potential GND. A current I227 flowing through the output resistor 227 is proportional to the current I222 through the further resistor by way of the current mirror ratio of the current mirror 225, 226. In particular, the voltage V12_2 present across the output resistor 227 or the current measurement signal is proportional to the input current I_in, where the following holds true:

$$V12\_2 = R227 \cdot n \cdot y/x \cdot I\_in \quad (5).$$

In this case, R227 denotes the resistance of the output resistor 227, y/x denotes the ratio between the area of the output transistor 226 and the area of the input transistor 225 of the current mirror, and n denotes the ratio between the resistance of the further resistor 222 and the current detecting resistor 221.

Optionally, in the case of the arrangement illustrated in FIG. 12, a further transistor 228 is connected in series with the output resistor 227, which transistor is connected to a reference potential (not illustrated in specific detail) and prevents the occurrence of the so-called "Early effect".

Preferably, a current limiting arrangement that limits the input current I_in is additionally connected upstream of the terminal 102. Said current limiting arrangement has a transistor 241 connected upstream of the input 102, which transistor is turned on by a driver circuit 242 in the normal operating state. A measuring arrangement 243 detects the voltage drop across the current detector resistor 221 and hence the input current I_in. Said measuring arrangement drives a further transistor 244, the load path of which is connected between the control terminal of the input transistor 241 and reference-ground potential GND. Depending on the value of the detected input current I_in, the input transistor 241 is regulated downward by means of the current measuring arrangement 243 and said further transistor 244 in order to limit the input current I_in to a predetermined maximum value.

Figure 13:
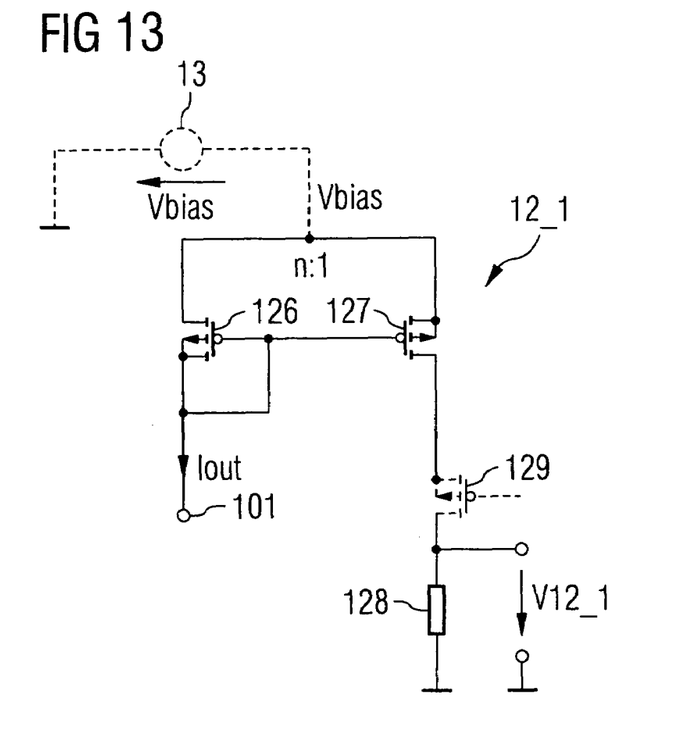
FIG. 13 shows an exemplary embodiment of a current measuring arrangement having a current mirror.
Figure 14:
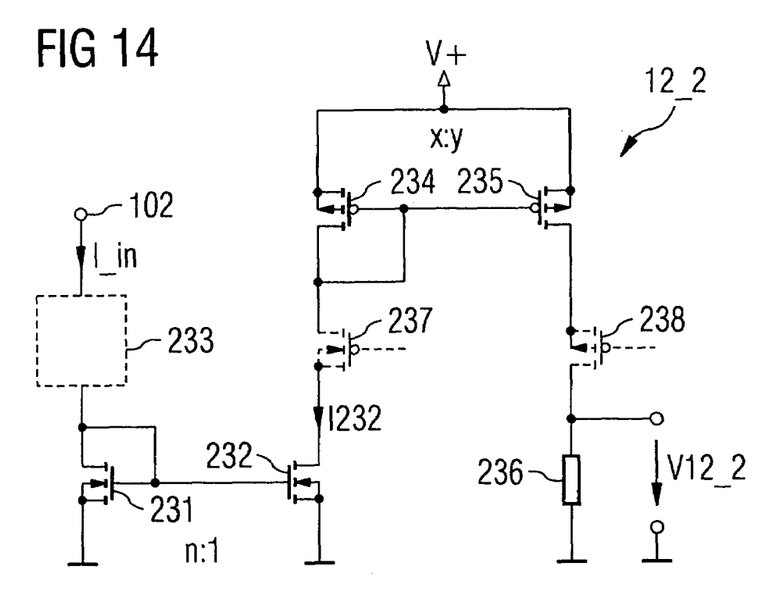
FIG. 14 shows a further exemplary embodiment of a current measuring arrangement having a current mirror.

Referring to FIGS. 13 and 14, there is also the possibility of realizing the two current measuring arrangements 12_1, 12_2 in the form of a current mirror having two current mirror transistors, one of which is connected up as a diode.

FIG. 13 shows an alternative exemplary embodiment of the first current measuring arrangement 12_1 using such a current mirror, and FIG. 14 shows an alternative exemplary embodiment of the second current measuring arrangement 12_2 using a current mirror.

The alternative of the first current measuring arrangement 12_2 as illustrated in FIG. 13 has a current mirror having an input transistor 126 connected up as a diode and having an output transistor 127. The gate terminals of these two transistors 126, 127 are connected to one another in a manner customary in the case of current mirrors. The input transistor 126 is connected between the voltage source 13 supplying the bias voltage Vbias (illustrated by dashed lines in FIG. 13) and the first terminal 101. The output current Iout flowing through the output terminal 101 is mapped onto a measuring resistor or output resistor 128 by means of the current mirror 126, 127. The current I128 flowing through said output resistor is proportional to the output current Iout by way of the current mirror ratio n:1. The same applies correspondingly to the output voltage V12_1 present across the output resistor 128 or the current measurement signal of the first current measuring arrangement 12_1. The following holds true for said current measurement signal:

$$V12\_1 = R128 \cdot 1/n \cdot Iout \quad (6).$$

In this case, R128 denotes the resistance of the output resistor, n denotes the ratio between the transistor area of the input transistor 126 and the transistor area of the output transistor 127 of the current mirror.

Optionally, in the case of the current measuring arrangement 12_1 illustrated in FIG. 13, in order to avoid the Early effect, a further transistor 129 connected to a reference voltage source (not illustrated in specific detail) is connected between the output transistor 127 and the output resistor 128.

An alternative configuration of the second current measuring arrangement 12_2 using a current mirror is illustrated in FIG. 14. This current measuring arrangement 12_2 differs from the one illustrated in FIG. 12 essentially by virtue of the fact that a current mirror having an input transistor 231 connected up as a diode and having an output transistor 232 is present instead of the current detecting resistor and the regulating arrangement having the operational amplifier, the regulating transistor and the further resistor. In this case, the input transistor 231 is connected between the second terminal 102 and reference-ground potential GND. This current mirror 231, 232 maps the input current I_in flowing through the input transistor 231 onto a current I232 flowing through the output transistor 232. By means of a further current mirror 234, 235, said current I232 is mapped onto an output resistor 236, at which the second current measurement signal V12_2 is available. The further current mirror has an input transistor 234 that is connected up as a diode and is connected between a supply potential V+ and the output transistor 232 of the first current mirror. An output transistor 235 of this further current mirror is connected between the supply potential V+ and the output resistor 235. In this current measuring arrangement 12_2, too, the current measurement signal V12_2 is proportional to the input current I_in, where the following holds true:

$$V12\_2 = R236 \cdot y/x \cdot n \cdot I\_in \qquad (7).$$

In this case, R236 denotes the resistance of the output resistor 236, n denotes the ratio between the transistor area of the input transistor 231 and the output transistor 232 of the first current mirror, and x/y denotes the area ratio between the transistor area of the input transistor 234 and the transistor area of the output transistor 235 of the further current mirror.

Optionally, in the case of this current measuring arrangement, too, further transistors 237, 238 are connected in series with the transistors of the further current mirror, which are connected to reference potentials (not illustrated in specific detail) and which serve for avoiding the Early effect.

Optionally, in the case of this current measuring arrangement 12_2, too, a current limiting arrangement 233 is present, which may be formed according to the current limiting arrangement explained in FIG. 12.

Figure 15:
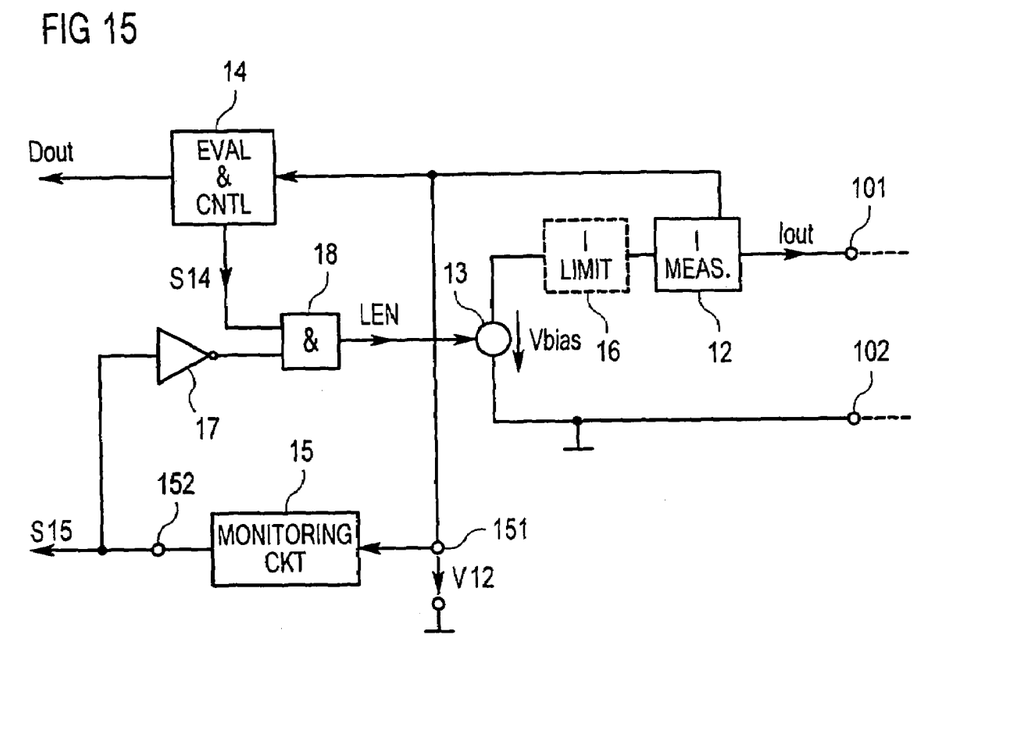
FIG. 15 shows a further exemplary embodiment of a driver and receiver circuit according to the invention.

FIG. 15 shows a further exemplary embodiment of a driver and receiver circuit. In the case of this circuit, the activation signal LEN of the voltage source 13 is generated dependent on a control signal generated by the evaluation and control circuit 14 and dependent on the error signal, the activation signal being generated from the error signal and the control signal S14 by an AND gate 18. Assuming that the error signal S15 assumes a low level in the case of a detected error, the voltage source is deactivated directly after detection of an error in the case of the arrangement.

It will be appreciated that the above described embodiments are merely illustrative, and that those of ordinary skill in the art may readily devise their own modifications and implementations that incorporate the principles of the invention and fall within the spirit and scope thereof.

The invention claimed is:

1. A driver and receiver circuit comprising:
   at least one output terminal configured to connect to a line connection,
   a voltage supply connected to the at least one output terminal,
   a current measuring arrangement connected to the at least one output terminal, the current measuring arrangement configured to detect a current at the at least one output terminal and to generate a current measurement signal dependent on the current, wherein the current measuring arrangement is operable to include information representative of information modulated on the current in the current measurement signal,
   at least one monitoring circuit configured to generate an error signal based on the current at the at least one output terminal, and to generate the error signal when the current lies above a predetermined threshold value for a time duration which is longer than a predetermined first time duration, and
   a control circuit, to which the current measurement signal is fed, wherein the control circuit is operably connected to receive the error signal, and wherein the control circuit is configured to generate the control signal based at least in part on the error signal.

2. The driver and receiver circuit as claimed in claim 1, wherein the at least one monitoring circuit comprises:
   a comparator arrangement configured to generate a comparison signal dependent on a comparison of the current measurement signal and a reference value, and
   a time measuring arrangement configured to evaluate the temporal duration of a predetermined level of the comparison signal and to generate a time measurement signal dependent thereon, the error signal being generated dependent on said time measurement signal.

3. The driver and receiver circuit as claimed in claim 1, in which the at least one monitoring circuit has a logic circuit operable to receive the time measurement signal and a control signal, and which is operable to provide the error signal.

4. A driver and receiver circuit comprising:
   at least one output terminal configured to connect to a line connection,
   a current measuring arrangement connected to the at least one output terminal, the current measuring arrangement configured to detect a current at the at least one output terminal and to generate a current measurement signal dependent on the current, wherein the current measuring arrangement is operable to include information representative of information modulated on the current in the current measurement signal,
   at least one monitoring circuit configured to generate an error signal based on the current at the at least one output terminal, and to generate the error signal when the current lies above a predetermined threshold value for a time duration which is longer than a predetermined first time duration, and
   a control circuit, to which the current measurement signal is fed,
   a voltage supply arrangement connected to the at least one output terminal, wherein the voltage supply arrangement is activated and deactivated by the control circuit by means of a control signal, and wherein at least one monitoring signal is configured to receive the control signal, and in which the monitoring circuit is configured to generate, after a level change of the control signal to a level that activates the voltage supply arrangement, the error signal at the earliest after a second time duration has elapsed after said level change.

5. The driver and receiver circuit as claimed in claim 4, wherein the at least one monitoring circuit comprises:
   a comparator arrangement configured to generate a comparison signal dependent on a comparison of the current measurement signal and a reference value, and
   a time measuring arrangement configured to evaluate the temporal duration of a predetermined level of the comparison signal and to generate a time measurement signal dependent thereon, the error signal being generated dependent on said time measurement signal.

6. The driver and receiver circuit as claimed in claim 5, in which the at least one monitoring circuit has a logic circuit operable to receive the time measurement signal and a control signal, and which is operable to provide the error signal.

7. A driver and receiver circuit comprising:
at least one output terminal configured to connect to a line connection,
a voltage supply connected to the at least one output terminal,
a current measuring arrangement connected to the at least one output terminal, the current measuring arrangement configured to detect a current at the at least one output terminal and to generate a current measurement signal dependent on the current,
a control circuit, to which the current measurement signal is fed,
at least one monitoring circuit configured to generate an error signal based on the current at the at least one output terminal, and to generate the error signal when the current lies above a predetermined threshold value for a time duration which is longer than a predetermined first time duration, and wherein the at least one monitoring circuit has a further current measuring arrangement connected to the at least one output terminal, the further current measuring arrangement being designed to generate a current measurement signal dependent on the current at said output terminal.

8. A driver and receiver circuit comprising:
at least one output terminal configured to connect to a line connection,
a voltage supply connected to the at least one output terminal,
a current measuring arrangement connected to the at least one output terminal, the current measuring arrangement configured to detect a current at the at least one output terminal and to generate a current measurement signal dependent on the current,
a control circuit, to which the current measurement signal is fed, and
at least one monitoring circuit configured to generate an error signal based on the current at the at least one output terminal, and to generate the error signal when the current lies above a predetermined threshold value for a time duration which is longer than a predetermined first time duration, and wherein the at least one monitoring circuit has the following features:
a comparator arrangement configured to generate a comparison signal dependent on a comparison of the current measurement signal and a reference value, and
a time measuring arrangement configured to evaluate the temporal duration of a predetermined level of the comparison signal and to generate a time measurement signal dependent thereon, the error signal being generated dependent on said time measurement signal.

9. The driver and receiver circuit as claimed in claim 8, in which the at least one monitoring circuit has a logic circuit operable to receive the time measurement signal and a control signal, and which is operable to provide the error signal.

10. A driver and receiver circuit comprising:
at least one output terminal configured to connect to a line connection,
a voltage supply connected to the at least one output terminal,
a current measuring arrangement connected to the at least one output terminal, the current measuring arrangement configured to detect a current at the at least one output terminal and to generate a current measurement signal dependent on the current,
a control circuit, to which the current measurement signal is fed,
at least one monitoring circuit configured to generate an error signal based on the current at the at least one output terminal, and to generate the error signal when the current lies above a predetermined threshold value for a time duration which is longer than a predetermined first time duration, and
a first and a second connecting terminal, and wherein the at least one monitoring circuit comprises a first monitoring circuit configured to monitor a current at the first output terminal, and a second monitoring circuit configured to monitor a current at the second output terminal.

* * * * *